United States Patent [19]

Geiger

[11] 4,452,848

[45] Jun. 5, 1984

[54] COMPOSITE ROOF MEMBRANE

[76] Inventor: David H. Geiger, Kirby La., Rye, N.Y. 10580

[21] Appl. No.: 527,322

[22] Filed: Aug. 29, 1983

[51] Int. Cl.³ .............................................. B32B 7/00
[52] U.S. Cl. .................................... 428/247; 428/246; 428/251; 428/252; 428/285; 428/336; 428/421; 428/422; 428/446
[58] Field of Search ............... 428/111, 247, 255, 251, 428/284, 285, 421, 422, 446, 141, 142, 252, 246, 336

[56] References Cited

U.S. PATENT DOCUMENTS

| 3,899,622 | 8/1975 | Geiger | 428/245 |
| 4,013,812 | 3/1977 | Geiger | 428/251 |
| 4,301,204 | 11/1981 | McCusker et al. | 428/247 |
| 4,368,228 | 1/1983 | Gorgati | 428/247 |

Primary Examiner—James J. Bell
Attorney, Agent, or Firm—Arthur V. Smith; Pasquale A. Razzano

[57] ABSTRACT

A composite roof membrane for use in air supported and/or tensioned roof structures comprises an interior vapor barrier formed of a scrim reinforced thin film material, an intermediate layer of translucent flexible insulation, and an outer layer of liquid impervious but vapor porous fabric.

20 Claims, 6 Drawing Figures

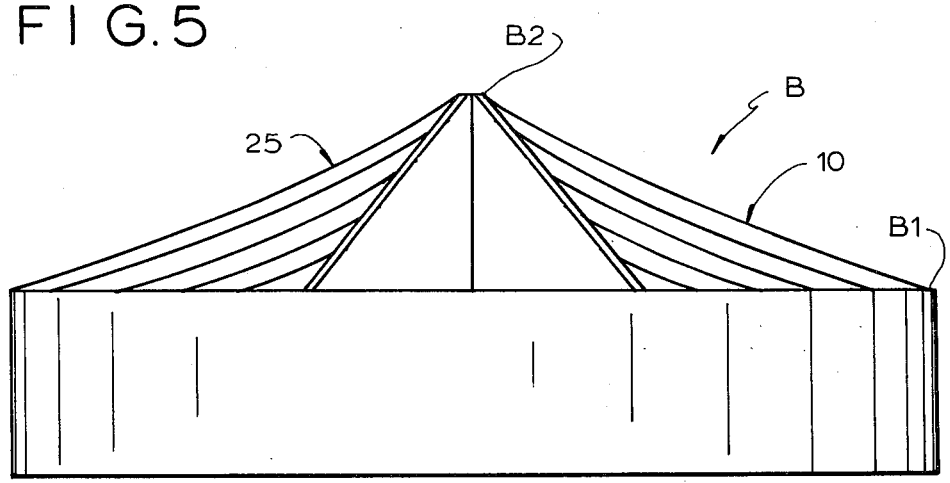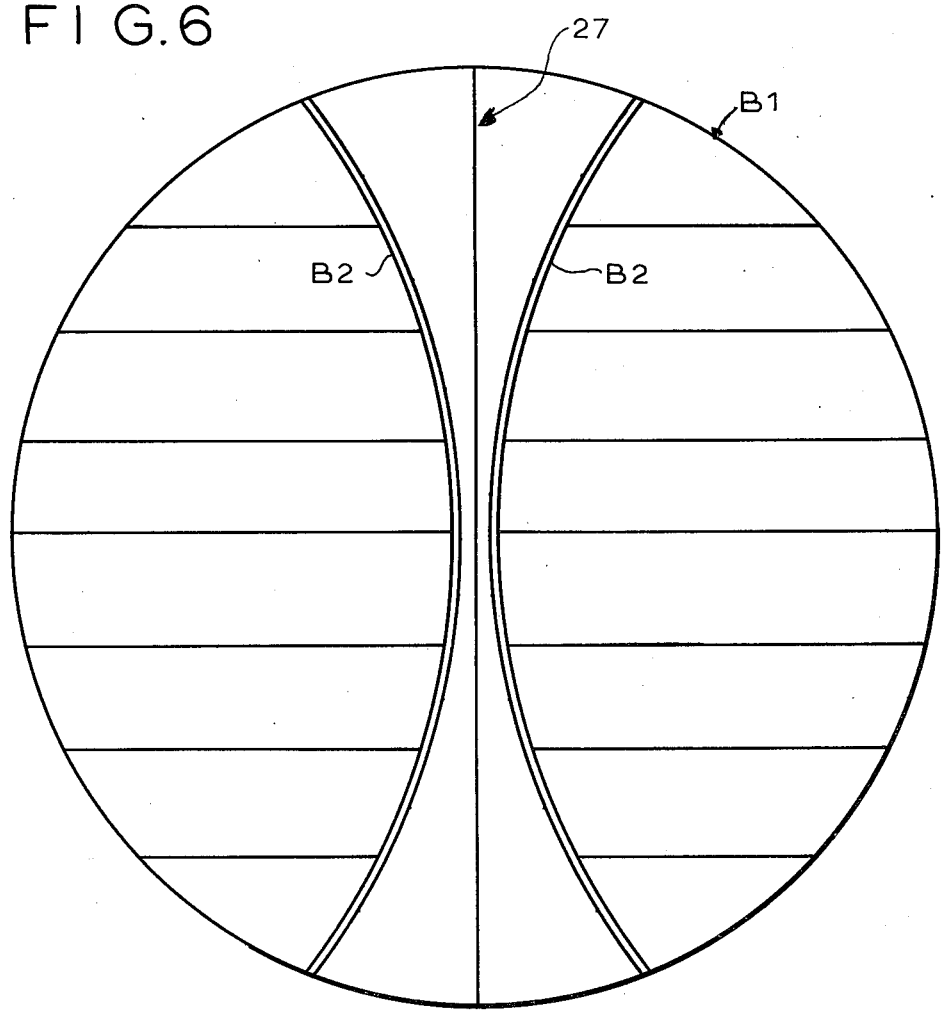

COMPOSITE ROOF MEMBRANE

The present invention relates to roofing materials and more in particular, to a composite roof material which is adapted to be used in membrane constructions for building roofs, domes, air supported structures, tensioned roof structures and the like.

In many types of building constructions, flexible sheet material is used to form a portion of the roof of the structure. This occurs, for example, in lightweight temporary building structures, such as geodesic domes and in more permanent structures, such as air inflated building constructions and tensioned roof construction systems, such as may be used for permanent sports stadium installations. Typically, the materials used in these constructions must have a relatively high strength since the material actually forms a structural element of the building.

A number of different types of membranes have been proposed for use in such structures which are generally satisfactory in terms of strength, weight and light translucence. One such material is shown, for example, in U.S. Pat. No. 3,899,622. However, for large structures, such as sports stadiums and for cold weather applications, such previously proposed membranes are not completely satisfactory. For example, in a large sports stadium, it is desirable that the membrane be not only translucent but that it also have the capacity to provide insulation for the structure and absorb sound.

Accordingly, it is an object of the present invention to provide a relatively lightweight composite roof membrane having high strength and providing insulating characteristics and possibly sound absorption.

Another object of the present invention is to provide a composite roof membrane which is adapted for use as a membrane in building structures and which is translucent while, at the same time, providing insulating values.

In accordance with one aspect of the present invention, the composite roof membrane for use in an air supported and/or tensioned roof structure is provided which includes an interior vapor barrier formed of a Tedlar film having a thickness of less than 1 mil. and reinforced by an open polyester scrim. At least one intermediate layer of translucent flexible fiberglass insulation having a thickness of between one and four inches overlies the scrim reinforced film. Finally, an outer fabric layer is provided overlying the fiberglass, which fabric is water impervious but vapor porous.

The above and other objects, features and advantages of this invention will be apparent in the following detailed description of an illustrative embodiment thereof, which is to be read in connection with the accompanying drawings, wherein:

FIG. 5 is an elevational view of a building structure adapted to use the roof membrane of the present invention; and FIG. 6 is a plan view of the structure shown in FIG. 1.

Figure 1:
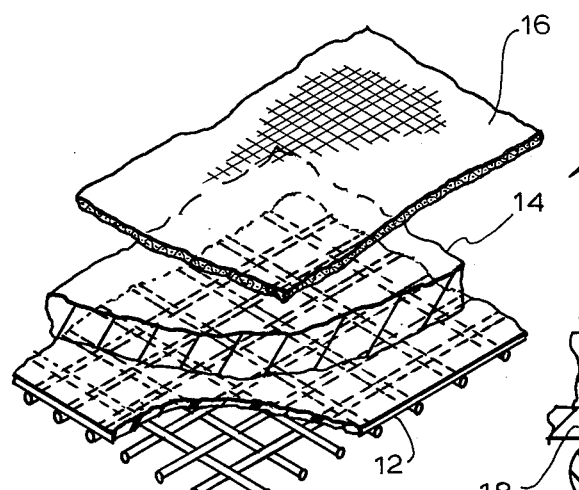
FIG. 1 is a perspective view of a portion of a composite roof member constructed in accordance with the present invention.

Referring now to the drawings in detail and initially to FIG. 1 thereof, it will be seen that a composite roof membrane 10 constructed in accordance with the present invention is formed from an inner layer of scrim reinforced film 12, an intermediate layer 14 of insulation, and an outer fabric layer 16.

The inner layer 12 is a vapor barrier which can be formed as a film scrim laminate, similar to the laminates shown in U.S. Pat. No. 3,899,622. More in particular, the scrim reinforced film 12 includes a thin film 18 having a thickness of less than 1 mil. secured to a web of fibers 20. The film 18 is preferably formed of a translucent plastic material, such as polytetrafluoroethylene, sold under the trademark "TEFLON" or other types of film materials, such as, for example, is sold under the trademark "TEDLAR."

The scrim 20 is formed as a foraminous layer, preferably of woven fiberglass fibers 22. The particular type of weave may be a simple over and under weave, as shown in FIG. 1, or a more complex leno weave or any type of weave which provides the desired strength characteristics in the sheet material. In any event, in accordance with the present invention, this scrim is formed to provide openings 24 therein so that the web or scrim is foraminous and the fiber layer 26 is thereby sufficiently unsupported to allow sound from the interior of the building in which the membrane is used to be absorbed by the insulation layer 14 immediately thereabove.

Figure 2:
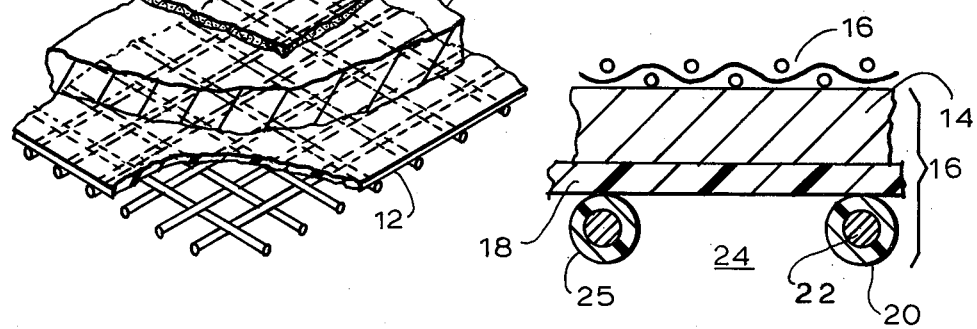
FIG. 2 is a sectional view taken along line 2—2 of FIG. 1.

As seen more clearly in FIG. 2, the fibers 22 of the scrim 20 are coated with a plastic material 25 which is compatible to the material of the sheet or film 18, as described more fully in U.S. Pat. No. 3,899,622.

With this arrangement, for the first time, it is believed that a vapor barrier film membrane had been used to serve the additional function of providing a sound absorbtion application. The composite scrim reinforced film 12 may also be the conventional "TEDLAR" polyester scrim product of the type produced by Orcon Corp. of Union City, Calif.

The insulation layer 14 is preferably formed of translucent fiberglass, similar to that used for furnace filtration, such as is manufactured by the Fibair Corp. of Reedsville, W. Va. The thickness of the insulation is preferably selected so that it is sufficient to prevent condensation and ice forming on the vapor barrier. It has been found that insulation having a thickness of four inches has an R value of approximately 3.5. However, in colder regions, additional layers of insulation may be required to increase the R value of the roof membrane.

The insulation layer of fiberglass is also vapor porous to allow for moisture transmission through the insulation and then through the upper fabric layer 16 so that ice and condensation will not form within the insulation damaging the fiberglass.

The upper fabric layer 16 may also be a simple woven fabric, or a leno weave, but with a much closer weave than that of the scrim 22. The fibers of the fabric 16 are preferably coated either with Teflon or with silicone so that the fabric is water impervious but vapour porous. It has been found that a silicone coated fiberglass is significantly more vapor porous than a Teflon coating on the fiberglass.

The coating of the fiberglass fibers in the fabric layer 16 may be done in the same manner as the coating of the fibers 22 in the scrim layer 20.

By using a fiberglass fabric coated with either Teflon or silicone, maximum translucency for the composite roof membrane can be achieved in the upper fabric while retaining a strength in the fabric of about 500 pounds per inch which is quite suitable for air supported dome structures or for tensioned roof structures of the type with which this material is intended to be used.

One such building structure using a tensioned roof arrangement is shown in FIG. 5. As seen therein, a building B of so-called sloped ring construction is provided utilizing a composite roof membrane 10 constructed in accordance with the present invention. This structure has a generally circular horizontal compression ring B1 about the periphery of the building and a pair of oppositely sloped arches B2 from which the multilayer fabric roof structure is supported and tensioned. The roof support system for the structure includes a plurality of concave cables 25 which are connected to the ring B1 and the sloped arches B2, respectively, and they are pretensioned, as is known in the art, to tension the fabric and create a relatively rigid roof structure. The space between the sloped arches is also covered with the same kind of material tensioned by cables 27.

Figure 3:
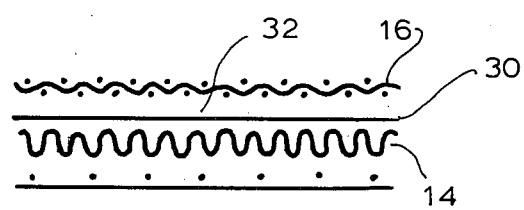
FIG. 3 is a schematic sectional view, similar to FIG. 2, of another embodiment of the invention.

In another embodiment of the present invention, shown schematically in FIG. 3, an additional film layer 30 is provided between the insulation 14 and the fabric 16 to define a space 32 below the fabric and above the film 30. The film layer 30 may be formed of a thin unreinforced film, with open seams between adjacent layers, to permit vapor passage from the insulation to the space 32 and through the fabric 16. The use of this film layer and the consequent formation of the space 32 permits air movement in the membrane above the insulation while preventing the collection of dirt on the fibrous insulation.

Figure 4:
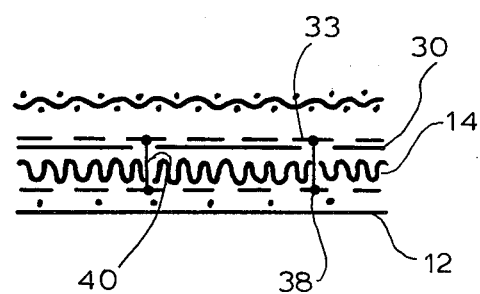
FIG. 4 is a schematic sectional view, similar to FIG. 2, of yet another embodiment of the present invention.

In another embodiment of the present invention, shown in FIG. 4, the insulation 14 and the film 30 are supported and retained within a pair of open fabric webbings 38 tied together in any convenient manner by stitching or the like 40, at spaced locations along the length of the membrane. These webbings provide support for the insulation and film 30, independently of the support provided by the lower scrim reinforced film layer 12, and reduces the stress placed on that film. It also provides a convenient packaging for the insulation. Of course, the webbing 38 is vapor porous.

The vapor porous upper membrane 16 also facilitates the composite structure remaining in assembled form when used in an air supported structure. With a light enough vapor barrier, the composite will be sound absorptive since the sound will be transmitted through the film as if the film were not there.

Accordingly, it is seen that from the above construction of the composite roof membrane, an insulating roof membrane is provided which can be used in air supported dome structures and in cable tensioned roof structures. In addition to providing insulation for the roof, the membrane is transparent so that substantial light passes into the building during daylight hours. Moreover, the membrane is sound absorptive and is particularly adapted for use in sports stadium.

Although illustrative embodiments of the present invention have been described herein with reference to the accompanying drawings, it is to be understood that the invention is not limited to those precise embodiments and that various other changes and modifications may be effected therein by one skilled in the art without departing from the scope or spirit of this invention.

What is claimed:

1. A composite roof membrane for use in air supported and tensioned roof structures comprising an interior vapor barrier formed of a scrim reinforced thin film material, an intermediate layer of translucent flexible insulation and an outer layer of liquid impervious but vapor porous fabric.

2. A composite roof membrane as defined in claim 1 wherein the film of said interior vapor barrier is formed of a Tedlar film.

3. A composite roof membrane as defined in claim 1 wherein the film of said interior vapor barrier is formed of Teflon.

4. A composite roof membrane as defined in claim 3 wherein the scrim reinforcing for the Tedlar film is formed of polyester.

5. A composite roof membrane as defined in claim 4 wherein said Tedlar film is less than 1 mil. thick.

6. A composite roof membrane as defined in claim 1 wherein said insulation is formed of fiberglass.

7. A composite roof membrane as defined in claim 6 wherein said fiberglass insulation comprises at least one layer four inches thick and having an R value of 3.5.

8. A composite roof membrane as defined in claim 1 wherein said outer fabric layer is formed of fiberglass fabric.

9. A composite roof membrane as defined in claim 8 wherein the fabric fibers of said outer fabric layer are coated with Teflon.

10. A composite roof membrane as defined in claim 8 wherein the fabric fibers of said outer fabric layer are coated with silicone.

11. A composite roof membrane as defined in claim 1 including an unreinforced film positioned between the insulation and said outer fabric layer.

12. A composite roof membrane as defined in claim 11 wherein said unreinforced film is formed of Tedlar.

13. A composite roof membrane as defined in claim 11 including open webbing layers respectively located above said unreinforced film and between said insulation and said vapor barrier, said open webbing layers being tied together at spaced locations through the insulation.

14. A composite roof membrane for use in air supported and tensioned roof structures comprising an interior vapor barrier formed of a Tedlar film having a thickness of less than one mil. reinforced by an open polyester scrim; at least one intermediate layer of translucent flexible fiberglass insulating having a thickness of from one to four inches; and an outer fiberglass fabric layer wherein the fibers thereof are coated and the fabric is liquid impervious and vapor porous.

15. A composite roof membrane as defined in claim 14 wherein said fiberglass fibers in said outer fabric are coated with one of the materials selected from the group consisting of Teflon and silicone.

16. A composite roof membrane as defined in claim 15 wherein said fiberglass insulation layer has an R value of about 3.5.

17. A composite roof membrane as defined in claim 15 wherein said open polyester scrim is formed of scrim fibers spaced about one inch apart to permit the sound to be transmitted through its associated film to the exterior of the building.

18. A composite roof membrane as defined in claim 17 including an unreinforced film positioned between the insulation and said outer fabric layer.

19. A composite roof membrane as defined in claim 18 wherein said unreinforced film is formed of Tedlar.

20. A composite roof membrane as defined in claim 19 including open webbing layers respectively located above said unreinforced film and between said insulation and said vapor barrier, said open webbing layers being tied together at spaced locations through the insulation.

* * * * *